United States Patent [19]
Imai

[11] Patent Number: 5,971,019
[45] Date of Patent: Oct. 26, 1999

[54] MISMATING-FREE CONNECTOR ASSEMBLY

[76] Inventor: Hiroshi Imai, c/o Surpass Industry Co., Ltd. 2204 Shimooshi, Gyouda-shi, Saitama, Japan

[21] Appl. No.: 09/071,958

[22] Filed: May 5, 1998

[30] Foreign Application Priority Data

Dec. 29, 1997 [JP] Japan ..................................... 9-369477

[51] Int. Cl.⁶ .................................................. F16L 37/28
[52] U.S. Cl. ...................... 137/614.04; 285/914; 285/330
[58] Field of Search .......................... 137/614.04, 614.06, 137/614; 285/914, 330, 913

[56] References Cited

U.S. PATENT DOCUMENTS

| | | | |
|---|---|---|---|
| 3,170,667 | 2/1965 | Szohatzky | 137/360 X |
| 4,280,723 | 7/1981 | Moldestad | 285/376 |
| 4,344,455 | 8/1982 | Norton et al. | 137/614 X |
| 4,665,960 | 5/1987 | Brzezicki et al. | 251/142 X |
| 4,709,726 | 12/1987 | Fitzgibbons | 137/614.04 X |

*Primary Examiner*—Kevin Lee
*Attorney, Agent, or Firm*—Browdy and Neimark

[57] ABSTRACT

The assembly comprises the tank-side connector 1 and the hose-side socket 2 detachably connected with the tank-side connector 1. The tank-side connector 1 is constructed of: a plug 4 in which a liquid-communication valve 5 for providing liquid communication is incorporated; and, a plug guide 3 for receiving the plug 4 therein. The plug guide 3 is provided with an opening portion in its upper surface. A ring 7 is embedded in the opening portion of the plug guide 3, and provided with at least one key projection 8 in a predetermined position. The key projection 8 is so arranged as to correspond to the type of liquid stored in a tank. The socket 2 is provided with an outer sleeve 21 an outer peripheral surface of which is provided with at least one key groove 25 in a position corresponding to that of the key projection 8. The key groove 25 slidably receives the key projection 8 therein in an insertion manner. Preferably, the ring 7 is colored a predetermined color indicating the type of liquid stored in the tank.

2 Claims, 3 Drawing Sheets

MISMATING-FREE CONNECTOR ASSEMBLY

BACKGROUND OF THE INVENTION

1. Field of the Invention

The present invention relates to a mismating-free connector assembly, and more particularly to a mismating-free connector assembly for properly and quickly connecting a tank, which stores a liquid such as petroleum products, industrial chemicals, coatings and the like therein, with a hose for drawing such liquid from the tank.

2. Description of the Related Art

Known in the related art is a method shown in FIG. 3, wherein a socket 50 is mounted on a front-end portion of a hose (not shown), and detachably connected with a plug 52 of a tank-side connector 51 provided in an upper surface of a tank (not shown), so that the hose is detachably connected with the tank. In this case, in order to guide a user to a proper selection of the tank (i.e., the kind of liquid stored therein), a plurality of key projections 53 are provided in an outer peripheral surface of the plug 52 at predetermined angular intervals so as to correspond to the kind of liquid stored in the tank. On the other hand, the socket 50 is provided with a sleeve 55, which is provided with a plurality of key grooves 54 in its inner peripheral surface at predetermined angular intervals so as to correspond in angular position to the key projections 53 of the plug 52. Consequently, in coupling or mating operation, the key projections 53 of the plug 52 are aligned with the key grooves 54 of the socket 50.

In this case, it is necessary for the user to confirm the position of each of the key projections 53 and the key grooves 54 through his own eyes each time the plug 52 is coupled or mated with the socket 50. Consequently, in case that the plug 52 is projected from an upper surface of the tank or tank-side connector 51, there is substantially no problem in coupling or mating them. In contrast with this, when the tank-side connector 51 itself is embedded in the tank so as to be disposed beneath the upper surface of the tank, or when the plug 52 is received inside the tank-side connector 51 so as to be disposed beneath the upper surface of the connector 51, it is hard for the user to confirm the position of each of the key projections 53 and the key grooves 54 through his eyes.

As described above, up to the present time it has been impossible to apply the method for coupling the socket with the plug by aligning in angular position the plug's key projections with the socket's key grooves to any connector assembly of the type having the tank-side connector embedded in the tank or of the type having the plug received inside the tank-side connector.

SUMMARY OF THE INVENTION

Consequently, it is an object of the present invention to provide a mismating-free connector assembly constructed of a tank-side plug and a hose-side socket, which assembly is capable of guiding a user to a proper selection of the tank, and enables him to properly and quickly connect the tank-side plug with the hose-side socket.

More particularly, as for connector assemblies of the type having a tank-side connector embedded in the tank or of the type having a plug received inside a tank-side connector, the object of the present invention is to provide a mismating-free connector assembly in which a hose-side socket forming one of a pair of co-operating mating members is properly and quickly connected with the other mating member, i.e., a tank-side plug in a steady manner without failing to select a proper one of tanks.

According to a first aspect of the present invention, the above object of the present invention is accomplished by providing:

In a mismating-free connector assembly comprising a pair of co-operating mating members, one of which forms a tank-side connector and the other of which forms a hose-side socket detachably connected with the tank-side connector, the improvement wherein:

the tank-side connector is constructed of: a plug in which a liquid-communication valve for providing liquid communication is incorporated; and, a plug guide for receiving the plug therein;

the plug guide is provided with an opening portion in its upper surface;

a ring is embedded in the opening portion of the upper surface of the plug guide;

the ring is provided with at least one key projection in a predetermined position, the key projection being so arranged as to correspond to the type of liquid stored in a tank;

the socket is provided with an outer sleeve an outer peripheral surface of which is provided with at least one key groove in a position corresponding to that of the key projection, the key groove slidably receiving the key projection therein in an insertion manner.

According to a second aspect of the present invention, the above object of the present invention is accomplished by providing:

The mismating-free connector assembly as set forth in the first aspect of the present invention, wherein;

the ring is colored a predetermined color so as to correspond to the type of liquid stored in the tank.

DESCRIPTION OF THE PREFERRED EMBODIMENTS

Hereinbelow, the present invention will be described in detail with reference to the accompanying drawings.

Figure 1A:
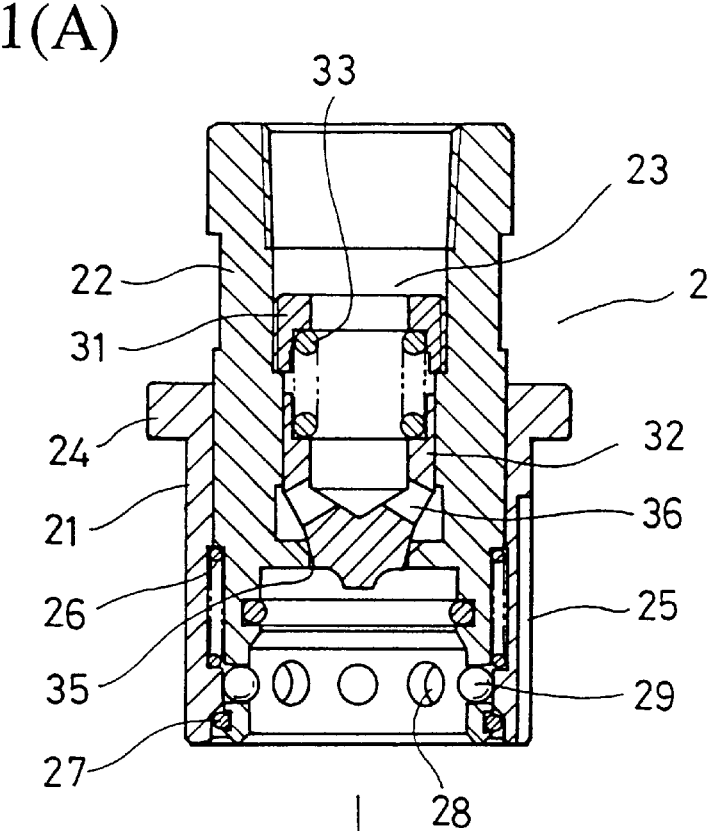
FIG. 1(A) is a longitudinal sectional view of the hose-side socket of the mismating-free connector assembly of the present invention.
Figure 1B:
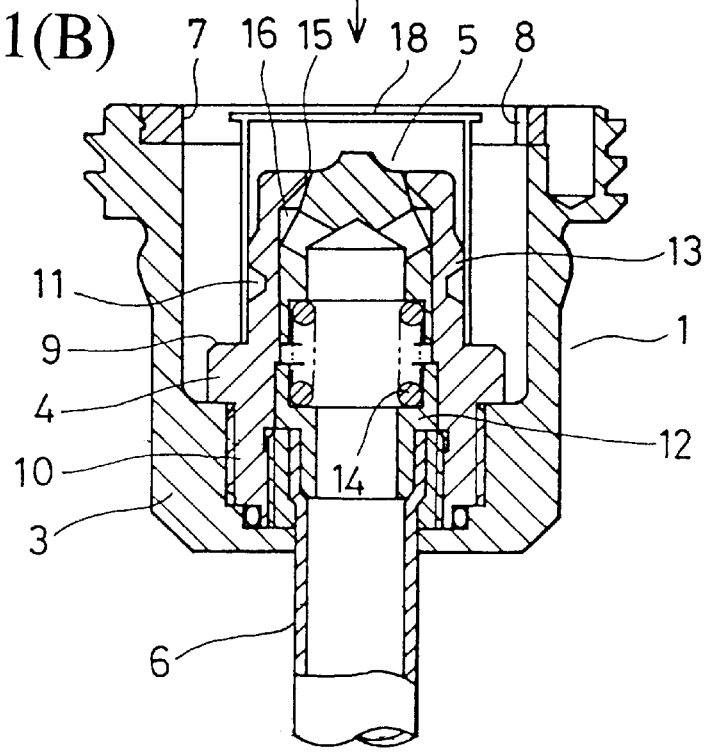
FIG. 1(B) is a longitudinal sectional view of the tank-side connector of the mismating-free connector assembly of the present invention shown in FIG. 1(A)

FIGS. 1(A) shows, in longitudinal section, a hose-side socket 2 to be mounted in an end portion of a hose (not shown) and the like. On the other hand, FIG. 1(B) shows, in longitudinal section, a tank-side connector 1 to be embedded in a tank (not shown). The hose-side socket 2 is detachably coupled with the tank-side connector 1 to form a mismating-free connector assembly of the present invention.

The tank-side connector 1 is constructed of: a plug guide 3; a plug 4, which is disposed inside the plug guide 3 and threadably connected therewith; a valve 5 disposed inside the plug 4; and, a pipe 6 extending from the valve 5 toward the bottom of the tank (not shown).

Figure 2A:
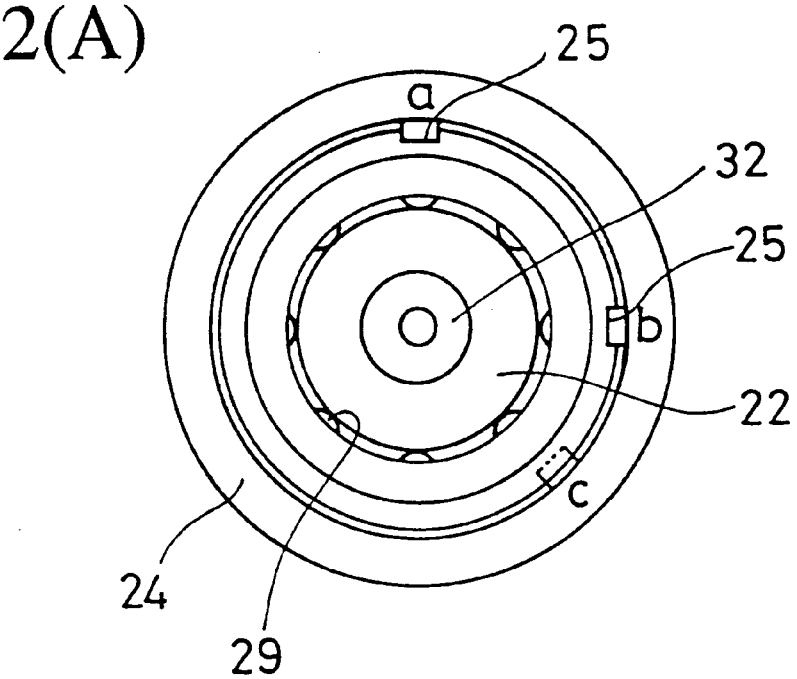
FIG. 2(A) is a bottom view of the hose-side socket shown in FIG. 1(A)
Figure 2B:
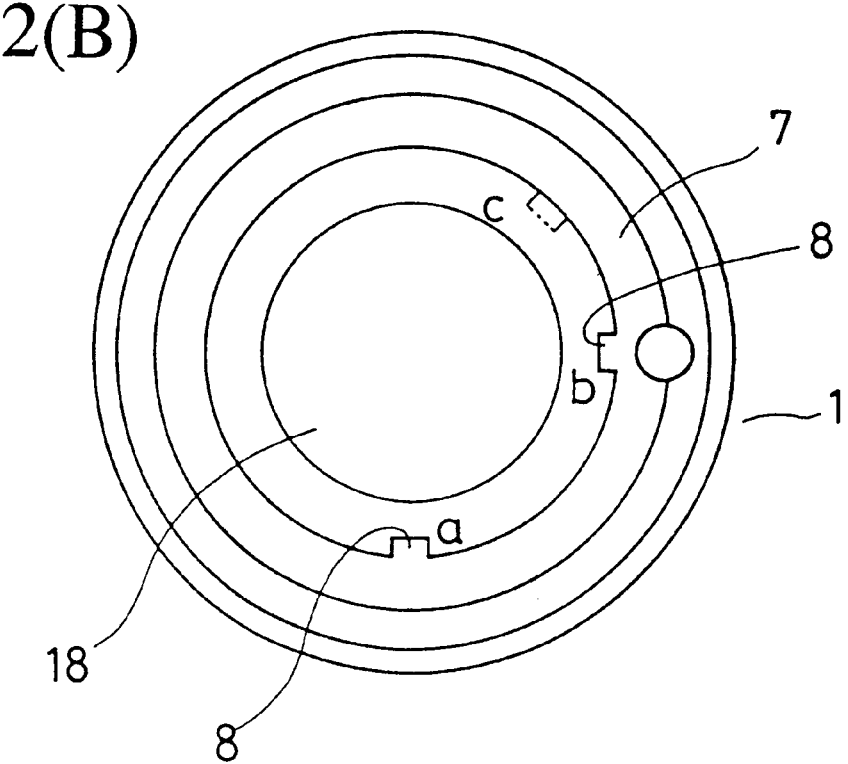
FIG. 2(B) is a plan view of the tank-side plug shown in FIG. 1(B)
Figure 3:
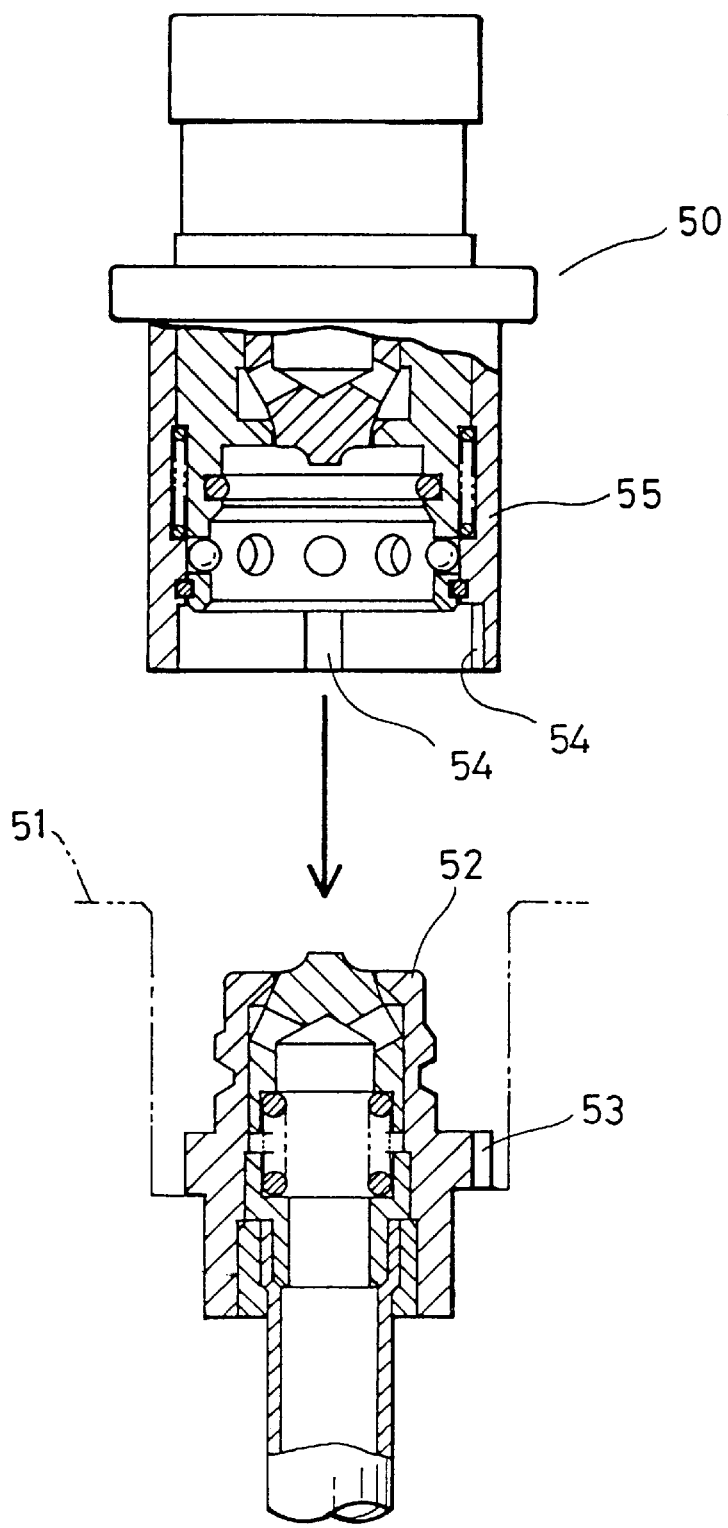
FIG. 3 is a longitudinal sectional view of the connector assembly of the prior art, illustrating its hose-side socket and its tank-side connector in their coupling or mating operation.

In FIG. 1(B), the reference numeral 7 denotes a ring, which is fixedly mounted in an opening portion of an upper surface of the plug guide 3 in an insertion manner. Preferably, the ring 7 is colored a predetermined color so as to indicate the type of liquid stored in the tank. Provided in an inner peripheral surface of the ring 7 at predetermined angular intervals are a plurality of key projections 8, which are so arranged as to correspond to the type of liquid stored in the tank. For example, as shown in FIG. 2(A), when the liquid stored in the tank is a liquid "A", the key projections 8 are disposed in angular positions "a" and "b". On the other hand, when the liquid stored in the tank is a liquid "B", the key projections 8 are disposed in angular positions "a" and "c" (shown in phantom line).

As is clear from FIG. 1(B), the plug 4 is provided with an annular stopper portion 9 in its intermediate portion. Provided in a lower portion of the plug 4 is a threaded sleeve portion 10, which has its outer peripheral surface and its inner peripheral surface formed into a male screw portion and a female screw portion, respectively. On the other hand, the plug guide 3 has its lower portion formed into a female screw portion, which is threadably engaged with the male screw portion formed in the threaded sleeve portion 10 of the plug 4, so that the plug 4 is fixedly mounted in the plug guide 3 through threadable engagement between the female screw portion of the plug guide 3 and the male screw portion of the plug 4. An annular groove 11 is formed in an outer peripheral surface of an upper portion of the plug 4.

As viewed in FIG. 1(B), the pipe 6 extending from the bottom of the plug guide 3 has its upper end portion disposed inside the plug guide 3 and formed into a male screw portion therein, which male screw portion is threadably engaged with the female screw portion of the threaded sleeve portion 10 of the plug 4, so that the pipe 6 has its upper end portion fixedly mounted in the plug guide 3 through the plug 4.

On the other hand, as shown in FIG. 1(B), the valve 5 is constructed of: a fixed portion 12; a movable portion 13; and, a spring 14 interposed between the fixed portion 12 and the movable portion 13. The spring 14 functions to always urge the fixed portion 12 and the movable portion 13 in opposite directions away from each other, so that a front-end portion of the movable portion 13 functions to close a front-end opening portion 15 of the plug 4. Further, the movable portion 13 is provided with at least one liquid-communication hole 16. In coupling operation, when the movable portion 13 is depressed against a resilient force exerted by the spring 14 to open the front-end opening portion 15 of the plug 4, the fluid to be transferred may pass through the liquid-communication hole 16 of the movable portion 13 and then issue from the front-end opening portion 15 of the plug 4. In FIG. 1(B), the reference numeral 18 denotes a plug cap which is detachably mounted on the plug 4.

On the other hand, as shown in FIG. 1(A), the socket 2 is constructed of: an inner sleeve 22 mounted in an outer sleeve 21 in an insertion manner; and, a valve 23 mounted in the inner sleeve 22. The outer sleeve 21 is provided with a flange portion 24 in its upper end. When the socket 2 is coupled with the tank-side connector 1, the socket 2 has the flange portion 24 of its outer sleeve 21 come into abutting contact with the ring 7 of the tank-side connector 1 to limit its insertion depth into the plug guide 3. A plurality of key grooves 25 are formed in an outer peripheral surface of the outer sleeve 21. Each of the key grooves 25 extends in a longitudinal direction of the outer sleeve 21. These key grooves 25 correspond in angular position to the key projections 8 of the ring 7, the number of which grooves 25 is the same as that of the key projections 8 of the ring 7.

In assembly (i.e., assembling operation), the inner sleeve 22 is inserted into the outer sleeve 21 from above against an resilient force exerted by a spring 26, has its lower-end portion projected outward from a lower end of the outer sleeve 21, and then a retaining ring 27 is mounted on the thus projected lower-end portion of the inner sleeve 22 to maintain the inner sleeve 22 in position illustrated in FIG. 1(A) in the outer sleeve 21 against the resilient force exerted by the spring 26. Further, provided in the lower-end portion of the inner sleeve 22 at predetermined angular intervals are a plurality of tapered through-holes 28 each of which is a radially outwardly divergent hole. In assembly, a ball 29 is movably mounted in each of the tapered through-holes 28 of the inner sleeve 22 in an insertion manner in a condition in which a part of the ball 29 slightly projects radially inwardly from an inner opening of each of the tapered through-holes 28 of the inner sleeve 22, so that the thus projected part of the ball 29 enters the annular groove 11 of the plug 4 when the hose-side socket 2 is coupled with the tank-side connector 1, whereby the socket 2 is coupled with the tank-side connector 1 with the highest certainty.

The valve 23 has substantially the same construction as that of the valve 5. In other words, the valve 23 is constructed of: a fixed portion 31; a movable portion 32; and, a spring 33 interposed between the fixed portion 31 and the movable portion 32. The spring 33 functions to always urge the fixed portion 31 and the movable portion 32 in opposite directions away from each other, so that a front-end portion of the movable portion 32 functions to close a front-end opening portion 35 of the inner sleeve 22. Further, the movable portion 32 is provided with at least one liquid-communication hole 36. In coupling operation, when the movable portion 32 is depressed against a resilient force exerted by the spring 33 to open the front-end opening portion 35 of the inner sleeve 22, the fluid to be transferred may pass through the liquid-communication hole 36 of the movable portion 32 and then issue from the front-end opening portion 35 of the inner sleeve 22 to enter the hose (not shown) through the hose-side socket 2.

In the mismating-free connector assembly of the present invention having the above construction, when it is desired to couple the socket 2 with the tank-side connector 1, first the plug cap 18 is removed from the plug 4 of the tank-side connector 1. Then, the key grooves 25 of the socket 2 are aligned in angular position with the key projections 8 of the tank-side connector 1. Under such circumstances, the socket 2 is inserted into the tank-side connector 1 and has its flange portion 24, comes into abutting contact with the ring 7 of the tank-side connector 1, so that the socket 2 is coupled with the tank-side connector 1 without fail. At this time, as is clear from FIGS. 1(A) and 1(B), since the key grooves 25 of the socket 2 are in the outer surface of the outer sleeve 21 of the socket 2 and the key projections 8 of the tnak-side connector 1 are in the upper-end portion of the plug guide 3, it is possible for the user to easily see or confirm them through his own eyes, which facilitates aligning of the key grooves 25 with the key projections 8 in coupling operation, so that the socket 2 is easily and quickly coupled with the tank-side connector 1 with reliability.

When the user makes a mistake in the selection of the tank (i.e., the type of liquid stored therein), he cannot align the key grooves 25 of the socket 2 with the key projections 8 of the tank-side connector 1. Consequently, there is no fear that the wrong tank is coupled or mated with the hose through the mismating-free connector assembly of the present invention. In this connection, when the ring 7 is colored a predetermined color corresponding to the type of liquid stored in the tank (not shown), such color facilitates the user's check of the correct tank (i.e., the correct type of liquid stored therein).

In coupling or mating operation of the socket 2 and the plug 4, both the valves 5, 23 are brought into press-contact with each other, and, therefore retracted together to open both the liquid-communication holes 16, 36, so that the contents of the tank (not shown) is drawn from the tank to the hose (not shown) through the mismating-free connector of the present invention by means of a suitable pump (not shown).

As described above, in the mismating-free connector assembly of the present invention: the key grooves 25 are formed in the outer surface of the outer sleeve 21 of the socket 2; and, the key projections 8 are formed in the ring 7 fixedly mounted in the opening portion of the upper surface of the plug quide 3. Consequently, it is easy for the user to align the key grooves 25 of the socket 2 with the key projections 8 of the tank-side connector 1 using his eyes, which enables the user to quickly couple the hose (not shown) with the correct tank without fail.

According to the second aspect of the present invention, since the ring 7 is colored the predetermined color indicating the type of liquid stored in the tank (not shown), it is possible for the user to confirm the correct tank (i.e., the correct type of liquid stored in the tank) through the color of the ring 7. Consequently, the color of the ring 7 functions as an auxiliary means for preventing the hose (not shown) from being coupled with the wrong tank (not shown) through the mismating-free connector assembly of the present invention.

What is claimed is:

1. In a mismating-free connector assembly comprising a pair of co-operating mating members, one of which forms a tank-side connector and the other of which forms a hose-side socket detachably connected with said tank-side connector, the improvement wherein:

said tank-side connector has a u-shaped cross section, a top circular rim and a bottom wall, a plug having a first liquid communication valve to permit liquid communication through said tank-side connection and a second liquid communication valve in said socket, said plug engaged in a plug guide in said bottom wall;

said tank-side connector having a recessed edge around an inner circumference of said top circular rim spaced above an outlet of said first liquid-communication valve, a ring engaged in said recessed edge having at least one key projection in a predetermined position, said key projection being so arranged as to correspond to the type of liquid stored in a tank;

said socket having an outer sleeve on an outer peripheral surface which is provided with a flange and at least one key groove in a position corresponding to that of said key projection, said key groove slidably receiving said key projection therein in an insertion manner, and wherein said flange engages said ring in abutting contact to limit insertion of the socket into the tank-side connector and thereby couples the socket and plug guide together to permit liquid communication only through said first liquid-communication valve and said second liquid communication valve.

2. The mismating-free connector assembly as set forth in claim 1, wherein;

said ring is colored a predetermined color so as to correspond to the type of liquid stored in said tank.

\* \* \* \* \*